United States Patent [19]

Danaj

[11] Patent Number: 5,323,997

[45] Date of Patent: Jun. 28, 1994

[54] UNDERCARRIAGE TELESCOPIC SUPPORT STAND FOR USE WITH VEHICLE EXHAUST SYSTEMS

[76] Inventor: Stanley A. Danaj, 418 Beck Rd., Lindenhurst, Ill. 60046

[21] Appl. No.: 996,000

[22] Filed: Dec. 23, 1992

[51] Int. Cl.⁵ .......................................... F16M 13/00
[52] U.S. Cl. ................... 248/354.7; 248/407; 248/423; 248/352
[58] Field of Search ............... 248/676, 407, 423, 352, 248/354.6, 354.7; 254/108, 133 A; 292/DIG. 63, DIG. 65, 347, DIG. 13

[56] References Cited

U.S. PATENT DOCUMENTS

| | | | |
|---|---|---|---|
| 1,046,720 | 12/1912 | Barnes | 248/407 |
| 1,320,613 | 11/1919 | Gilcrease | 248/352 |
| 1,364,433 | 1/1921 | Gilcrease | 248/352 |
| 1,494,692 | 5/1924 | Lohlker | 248/188.9 X |
| 1,894,293 | 1/1963 | Green | 248/352 |
| 3,109,900 | 11/1963 | Van Hook | 292/DIG. 13 X |
| 3,178,146 | 4/1965 | Goodale | 248/407 X |
| 4,042,202 | 8/1977 | Molinari | 248/352 |
| 4,690,361 | 9/1987 | Lundiman | 248/352 |
| 4,856,747 | 8/1989 | Gano | 248/352 X |
| 5,092,143 | 3/1992 | Rumbles | 292/205 X |
| 5,180,131 | 1/1993 | Few | 248/352 |

FOREIGN PATENT DOCUMENTS 167085 4/1939 Switzerland .................... 248/354.7

Primary Examiner—David A. Scherbel
Assistant Examiner—Derek J. Berger
Attorney, Agent, or Firm—Patula & Associates

[57] ABSTRACT

An undercarriage telescopic support stand for use in conjunction with an automotive shop vehicle lift and is used by mechanics to perform undercarriage operation such as installing exhaust systems, shocks, struts and springs. The device provides a vertically adjustable shaft which can be adapted to reach and support an exhaust system, or other components located on the underside of a vehicle, at varying heights. The device is adjusted and held at the desired height through the use of an integral locking device

17 Claims, 3 Drawing Sheets

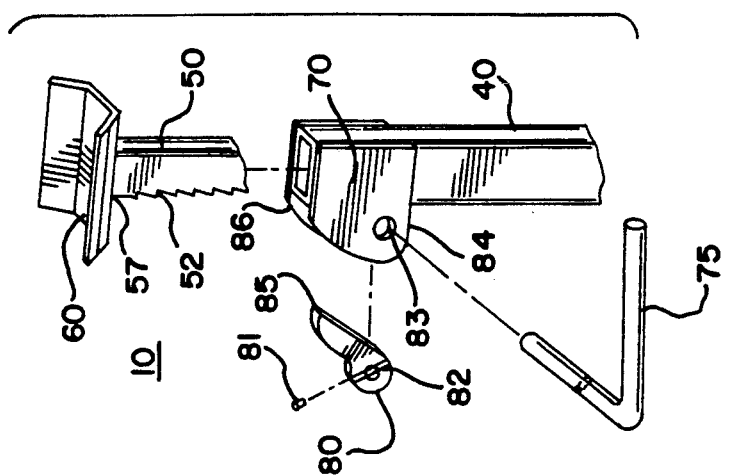
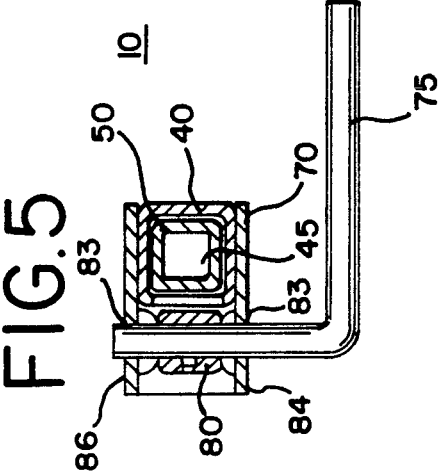
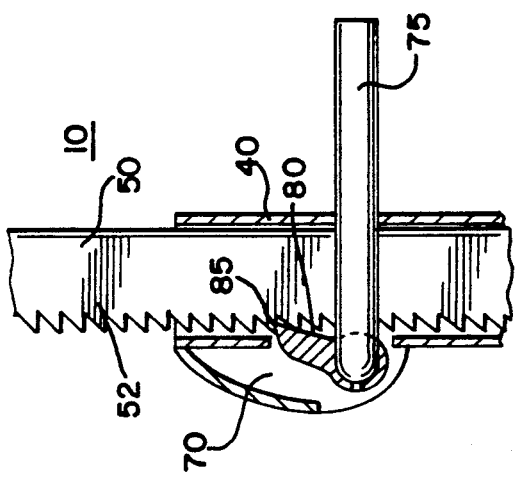
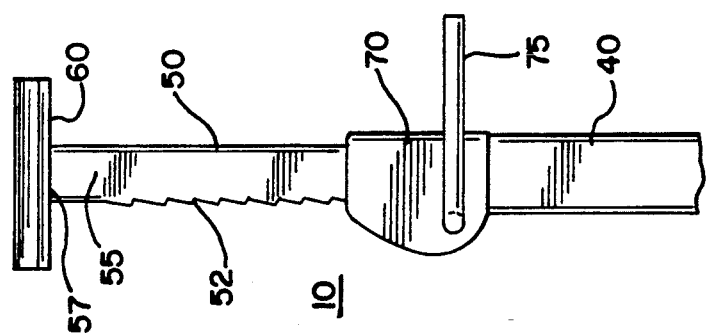
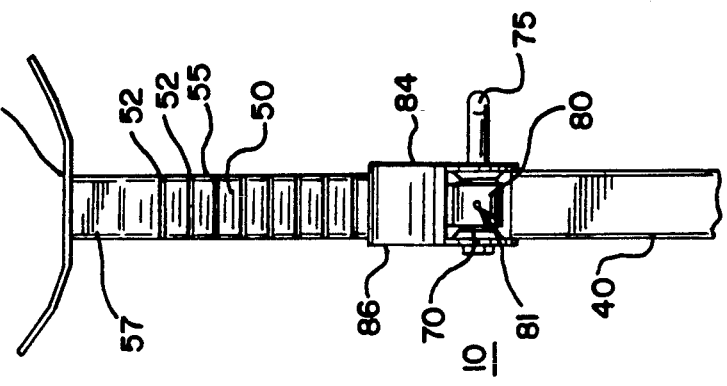

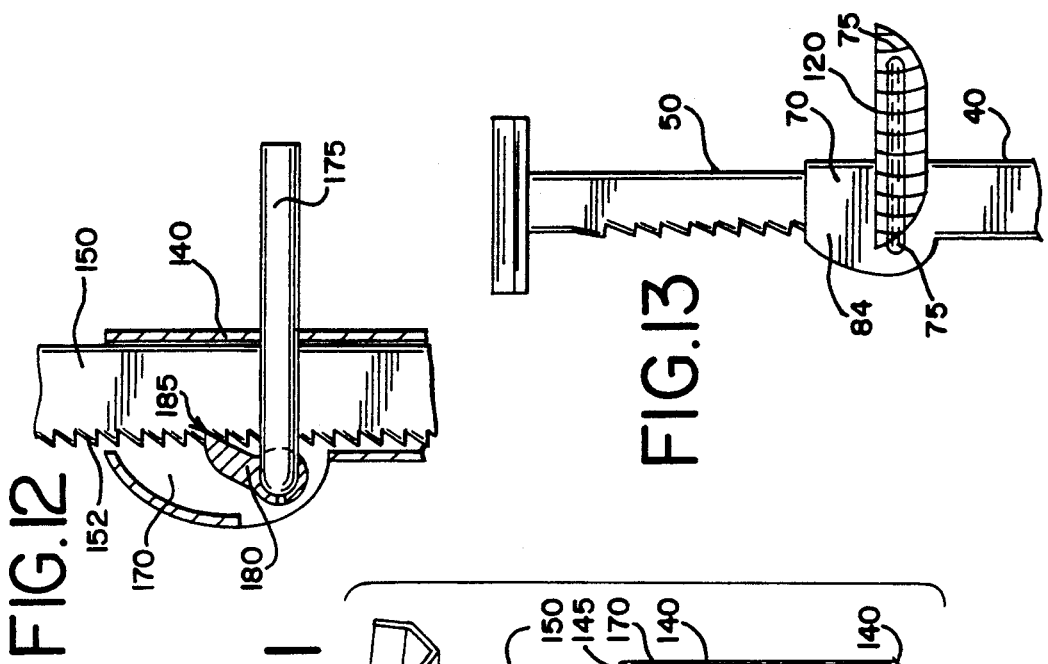

UNDERCARRIAGE TELESCOPIC SUPPORT STAND FOR USE WITH VEHICLE EXHAUST SYSTEMS

This invention relates to an undercarriage telescopic support stand for use in conjunction with an automotive shop vehicle lift and is used by mechanics to perform undercarriage operation such as installing exhaust systems, shocks, struts and springs. The device provides a vertically adjustable shaft which can be adapted to reach and support an exhaust system, or other components located on the underside of a vehicle, at varying heights. The device is adjusted and held at the desired height through the use of an integral locking device.

BACKGROUND OF THE INVENTION

With the advent of a new style of service stations which can service a vehicle in a matter of minutes, the established automotive repair industry has had to adapt in order to keep pace and stay in business. To keep costs down and prices competitive, while maintaining a profit, the automotive repair industry depends on mechanics who can service a vehicle quickly and single-handedly. Because of the cost of and shortage of skilled labor, the automotive repair market requires that many times a sole mechanic must perform the desired task single-handedly and as efficiently as possible. However, with the increased speed and need for mechanics to work on vehicles single-handedly, safety becomes a concern.

While a vehicle is elevated, a mechanic can service the multitude of components located on the underside of a vehicle. Commonly, the mechanic elevates a vehicle to service the vehicle's exhaust system, brake system, suspension or to change fluids such as oil. Without the proper stand, a mechanic must either have another person hold the component being serviced, or hold the component himself while another person hands him tools required for the job. If, on the other hand, the mechanic uses a conventional stand, then he must nevertheless recruit another person to help him maneuver and adjust the stand to support the component or components being serviced. Generally, the other person assisting the mechanic is a mechanic also. Hence, instead of servicing another vehicle and increasing service sales, the mechanic's time is wasted and the amount of profits is drastically cut. In today's automotive repair industry this inefficiency can be fatal to many vehicle service businesses. To alleviate this problem various types of support stands have been utilized.

Generally, a support stand is utilized in automotive repair to hold or position components being serviced on the underside of a vehicle while the vehicle is elevated. A support stand also functions as a safety device by holding components in place and by providing a safety catch for components which can become dislodged and fall during servicing. For example, a support stand can be used to catch and hold in place the body of a muffler while the mechanic is removing or replacing the connecting pipes of an exhaust system.

However, conventional support stands generally require more than one person to operate safely. With many of the presently available stands, one person must hold the stand while the other person adjusts and maneuvers the stand. Other available stands are operational by one person, but these stands generally require the mechanic to use both hands to adjust and maneuver the stand into position. A mechanic generally does not have two free hands to use in order to operate the support stand because one hand is either holding tools or holding or positioning the component being serviced or installed. Frequently, the mechanic may not have another person around to ask for assistance and may find himself in an uncomfortable and unsafe situation.

Furthermore, many of the support stands used in automotive shops are also unsafe because of the way the locking device is designed. The locking devices used to fix the support stand at a desired height generally utilize a pin which the user inserts into the appropriate hole integrated onto the support stand bar. This type of device requires the use of both hands and is time consuming because it is difficult to get the pin into the hole. Other locking devices use notches and a latch or locking device that are difficult to operate and which are expensive. These past devices are unsafe because they can easily be jarred and released thereby causing substantial injury or can accidentally slip causing the same hazard.

To date, the ways of producing quality support stands, more pertinently their locking mechanisms, are expensive and inefficient. The expense is obviously reflected in the price of support stands. Because cost cutting is as important in today's automotive repair industry as is safety, many automotive repair shops elect to purchase support stand units of low quality, or go without them.

The patent to Elliott, U.S. Pat. No. 4,375,934, issued on Mar. 8, 1983 for a Lifting and Positioning Apparatus for Construction Panels, discloses a support device having a fixed strut, a movable strut and a guide and latch arrangement for retaining the struts in a parallel relationship. The apparatus disclosed in the patent to Elliott is intended to be used to lift and position sheet rock. Elliott's apparatus is unsuitable to safely hold or support components being serviced on the underside of a vehicle when the vehicle is elevated. Elliott's apparatus essentially uses two stands each having a rail upon which a panel is rested across. Elliott's apparatus could not efficiently be used by one mechanic to support components on the underside of a vehicle.

In the patent to Harrigan, U.S. Pat. No. 4,520,981, issued Jun. 4, 1985, for an Adjustable Telescopic Support, a support is disclosed which includes an elongated telescoping slide bar that is movable within the hollow core of a standard. The support includes a locking device incorporating an adjustable member threadable into the hollow core of the standard and which frictionally engages the slide bar at a desired position. Harrigan's stand differs from the present invention in that, among other things, the locking device of the present invention quickly engages with one turn of a handle. In Harrigan's locking device, a handle must be rotated continuously until the end of the crank abuts the slide bar, thus taking up a significant amount of time. Further it would be extremely difficult for one person to hold the slide bar in proper position and at the same time rotate the crank over and over until secured. Additionally, Harrigan's mounting bracket would not safely support or hold small, curved components of the underside of a vehicle.

In the patent to Staples, U.S. Pat. No. 3,355,136, issued Nov. 28, 1967, for an Adjustable Support Device For a Vehicle, a support device is disclosed having an angled beam platform, a standard, a telescopic member in the standard and means to extend and hold the telescopic member. The locking device disclosed in the patent to Staples incorporates a pin which extends through holes integrated and aligned onto the standard and the member. The present invention differs from Staples' device in that, among other things, Staples' device is difficult and time consuming to lock via inserting a pin through two holes. The present invention can easily and quickly be locked by one person.

The patent to Petrie, U.S. Pat. No. 3,313,505, issued Apr. 11, 1967, for a Collapsible Stand, discloses a support stand having three portions: a first hollow elongated cylindrical tube member, a second hollow elongated cylindrical tube member that is inserted into the first member and threaded portion engaged with the second member. The device uses holes located on both of the hollow members, which may be aligned at a desired height and through which a bolt may be inserted as a locking device. Again, the locking device of Petrie is difficult and time consuming to engage with one hand while trying to hold the tube member in proper position.

The patent to Berg et al., U.S. Pat. No. 4,577,837, issued on Mar. 25, 1986 for a Locking Mechanism For Extendible Telescoping Tubular Members, discloses a locking device including at least one spring loaded lever that pivots about a fulcrum and which incorporates a ball-like end that engages registered openings in the telescoping tubular members. However, the locking device of Berg et al. consists of many components and requires the pressing of two plungers to disengage the device, whereas the present invention simply requires the turn of a handle to engage and disengage the locking device. Further, the locking device of Berg et al. is use in conjunction with a carpet stretcher and not on a vehicle support stand.

In the prior art discussed above, the support stands are either unsafe for the use of supporting components on the underside of a vehicle or are difficult and time consuming for one person to manipulate and lock. Therefore, there is a need for a safe and easy to operate apparatus for holding and supporting components found on the underside of an elevated vehicle while it is being serviced.

Accordingly, an object of the invention is to provide a device for use in conjunction with an automotive shop vehicle lift to support components located on the underside of that vehicle, while those or other components are being serviced, with increased safety for a mechanic.

Another object of the invention is to provide a maneuverable and easily adjustable device for holding and supporting components of varying heights located on the underside of a vehicle while the vehicle is elevated.

Yet another object of the invention is to provide an economical, safe and maneuverable device for holding and supporting components of varying heights on the underside of a vehicle while elevated, which is easily adjustable to the desired height by a person servicing the vehicle.

A further object of the invention is to provide a locking device to be used in conjunction with a support stand for holding and supporting components of varying heights and weights on the underside of a vehicle while elevated, which is easily adjusted and positioned with one hand by the person servicing the vehicle.

Numerous other advantages and features of the invention will become readily apparent from the detailed description of the preferred embodiment of the invention, from the claims, and from the accompanying drawings, in which like numerals are employed to designate like parts throughout the same.

SUMMARY OF THE INVENTION

In accordance with the present invention, all of these objects, as well as others not herein identified, are achieved generally by the present undercarriage telescopic support stand for use with vehicle exhaust systems, which includes a base section having at least three legs, an upper body having an outer, hollow shaft and an inner shaft sized to fit into the outer shaft. Included in the present invention is a locking device which is fully incorporated with the outer and inner shafts. The locking device includes a locking actuator positioned onto the outer shaft and a plurality of step-like formations or notches integrated into one side of the inner shaft. The locking actuator works in conjunction with the notches to allow the user to securely lock the inner shaft at a desired height extending from the outer shaft. Using the locking actuator, the user can quickly and easily lift the inner shaft to a desired height and lock it safely in place. Once locked in place, the present invention provides the user with a support stand that can be used while servicing an elevated vehicle.

BRIEF DESCRIPTION OF THE DRAWINGS

A fuller understanding of the foregoing may be had by reference to the accompanying drawings, wherein:

FIG. 3 is a frontal view of the upper portion of the support stand of the present invention with the inner shaft shown engaged by the locking device and having the preferred type of engagement slots;

FIG. 4 is a side view of the support device of the present invention showing the locking device of the present invention engaging the inner shaft at a desired height;

FIG. 5 is a top cross-sectional view of the support stand shafts and the locking device of the present invention and illustrating the full locking device handle;

FIG. 6 is an exploded perspective view of the locking device of the present invention;

FIG. 7 illustrates, in phantom, the locking device of the present invention engaged with one of the slots integrated into the support stand of the present invention;

FIG. 8 is a frontal view of the upper portion of the alternative embodiment of the support stand with the inner shaft shown engaged by the locking device and having the preferred type of engagement slots;

FIG. 9 shows a side view of the alternative embodiment of the locking device which is fully integrated onto the stationary shaft of the support stand;

FIG. 10 shows a top cross-sectional view of the alternative embodiment of the present invention;

FIG. 11 is an exploded perspective view of the alternative embodiment of the locking device; and FIG. 12 illustrates, in phantom, the alternative embodiment of the locking device engaged with one of the slots integrated into the support stand of the present invention; and FIG. 13 is a side view of an alternative embodiment of the present invention having a safety guard.

DETAILED DESCRIPTION OF THE PREFERRED EMBODIMENT OF THE INVENTION

Figure 2:
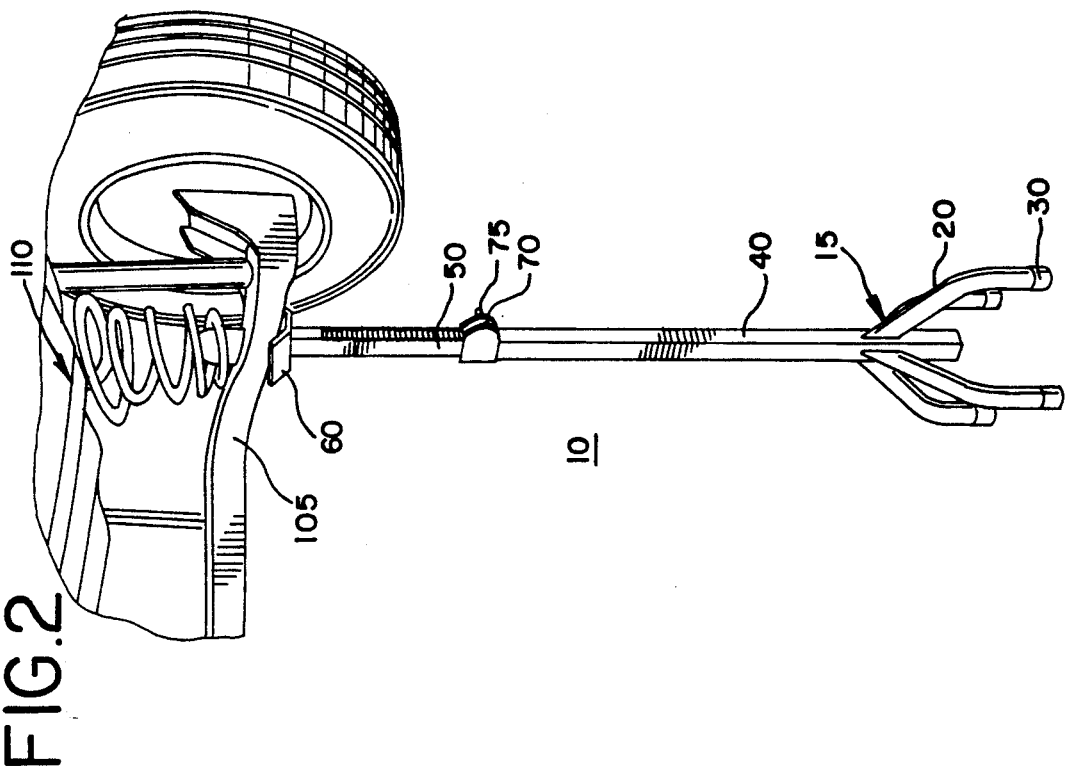
FIG. 2 is a perspective view illustrating the support stand of the present invention supporting the strut and spring components located on the underside of an elevated vehicle.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

Figure 1:
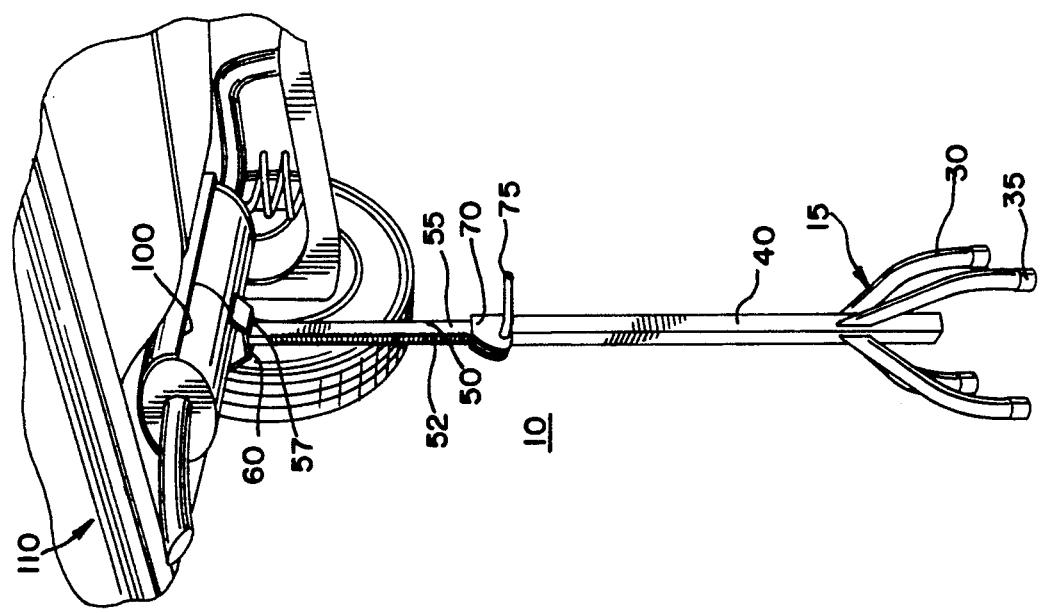
FIG. 1 is a perspective view illustrating the support stand of the present invention supporting the exhaust system located on the underside of an elevated vehicle.

Referring now to the drawings, FIG. 1 represents the preferred embodiment of the invention 10, consisting of a hollow outer shaft 40 having at one end a base support 15. The base support 15 consists of rounded legs 30 having conventional stabilizing and non-skid shoes 35. Attached to the other end of the base support 40 is a locking device 70, having a handle 75.

Disposed telescopically within the outer shaft 40 is an inner shaft 50. The inner shaft 50 has on it notches 52, perpendicular to side 55 of the inner shaft 50. At the top end 57 of the inner shaft 50 is attached a support plate 60. The support plate 60 supports a component of a conventional exhaust system 100 being installed on automobile undercarriage 110.

FIG. 2 shows an alternative use for invention 10. The support plate 60 is supporting strut 105 of undercarriage 110. Additionally, FIG. 2 shows an alternative embodiment of base support 15, the base support consisting of bent legs 20 having an angular configuration, rather than rounded legs 30 shown in FIG. 1.

FIG. 3 shows a front view of invention 10, with inner shaft 50 disposed telescopically within outer shaft 40. Locking device 70 has handle 75, and sides 84 and 86. Between sides 84 and 86 and disposed within locking device 70 is a latch 80, the latch 80 having an engagement device 81. Inner shaft 50 has notches 52 perpendicular to side 55, and disposed on top end 57 is support plate 60.

FIG. 4 shows a side view of invention 10, again with inner shaft 50 disposed telescopically within outer shaft 40, outer shaft 40 having locking device 70, with handle 75. The inner shaft 50 has notches 52 perpendicular to side 55, and at the top end 57 of inner shaft 50 is disposed support plate 60.

FIG. 5 is a top view of the invention 10. Locking device 70 has sides 84 and 86, disposed on outer shaft 40. Latch 80 is disposed on handle 75, handle 75 disposed coaxially through locking device bore 83 of sides 84 and 86. Outer shaft 40 contains an inner passageway 45 for receiving inner shaft 50.

FIG. 6 is an exploded view of invention 10 showing inner shaft 50 having notches 52 and support plate 60 disposed at top end 57. Outer shaft 40 has locking device 70 with sides 84 and 86, handle 75 and latch 80. Latch 80 has latch bore 82, engagement device 81, and tip 85.

FIG. 7 illustrates in phantom locking device 70. Locking device 70 has latch 80 with tip 85 disposed on handle 75. Inner shaft 50 with notches 52 is telescopically disposed in outer shaft 40.

As seen in FIGS. 6 and 7, the locking device 70 consists of a locking device handle 75, and a latch 80, the latch having an engagement device 81, a latch bore 82 and a tip 85. The locking device is assembled by inserting the locking device handle 75 through a locking device bore 83 on side 84, through the latch 80 at latch bore 82, then through the locking device bore 83 on side 86. Engagement device 81 then secures latch 80 to handle 75.

The device is operated as illustrated in FIGS. 1 and 2, by placing it under a raised automobile under the undercarriage component 100 to be supported. The inner shaft 50 is then telescopically extended by the operator to the desired height so that the support plate 60 comes into contact with the component 100. The latch tip 85 automatically engages a notch 52. When the latch 80 is so engaged, it exerts force on the notch 52, which in turn prevents the inner shaft 50 of the support stand from sliding downward into outer shaft 40. Therefore, the component is securely and safely supported and the mechanic is free to work on the vehicle.

After the work is completed, the operator can then remove the device by lifting the locking handle 75 so that latch 80 rotatably disengages from notch 52. The inner shaft can then telescopically descends into the outer shaft, and the device can be moved to another location.

FIG. 8 shows a front view of an alternative embodiment, invention 20, with inner shaft 150 disposed telescopically within outer shaft 140. Locking device 170 has handle 175, and sides 184 and 186. Between sides 184 and 186 and disposed within locking device 170 is a latch 180, the latch 180 having an engagement device 181. Inner shaft 150 has notches 152 perpendicular to side 155, and disposed on top end 157 is support plate 160. The notches 152 of the alternative embodiment 20 differ from the notches 52 of the preferred embodiment 10 because the notches 152 are constructed by means of perforating one side of the inner shaft 150 at right angles to side 157. This allows for easier and more cost efficient manufacturing.

FIG. 9 shows a side view of invention 20 again with inner shaft 150 disposed telescopically within outer shaft 140, outer shaft 140 having locking device 170, with handle 175. The inner shaft 150 has notches 152 perpendicular to side 155, and at the top end 157 of inner shaft 150 is disposed support plate 160.

FIG. 10 is a top view of the invention 20. Locking device 170 has sides 184 and 186, disposed on outer shaft 140. Latch 180 is disposed on handle 175, handle 175 disposed coaxially through locking bore 183 of sides 184 and 186.

FIG. 11 is an exploded view of invention 20 showing inner shaft 150 having notches 152 and support plate 160 disposed at top end 157. Outer shaft 140 has locking device 170 with sides 184 and 186, handle 175 and latch 180. Latch 180 has latch bore 182, engagement device 181, and tip 185.

FIG. 12 illustrates in phantom locking device 170. Locking device 170 has latch 180 with tip 185 disposed on handle 175. Inner shaft 150 with notches 152 is telescopically disposed in outer shaft 140.

As seen in FIGS. 11 and 12, the locking device 170 consists of a locking device handle 175, and a latch 180, the latch having an engagement device 181, a latch bore 182 and a tip 185. The locking device 170 is assembled by inserting the handle 175 through a locking device bore 183 on side 184, through the latch 180 at latch bore 182, then through the locking device bore 183 on side 186. Engagement device 181 then secures latch 180 to locking handle 175.

The device 20 is operated in the same manner a device 10, as described above.

In another alternative embodiment, the devices 10 and 20 are the same as recited above, except that the locking device 70 has disposed upon it a safety guard 120 as illustrated in FIG. 13. The safety guard is attached to side 84, and thwarts the accidental lifting of the locking handle 75 by the operator. This prevents the accidental collapse of the inner shaft 50 into the outer shaft 40, reducing the likelihood that the operator will be injured by a falling component. As can be seen in FIG. 13, safety guard 120 is depicted as a cage-like member which partially surrounds locking handle 75.

What I claim is:

1. A vehicle component support stand comprising;
   a base support;
   an outer shaft having a first end and a second end, said second end supported by said base support means;
   an inner shaft having a first end and a second end, said inner shaft coaxial with said outer shaft;
   locking means for securing said inner shaft at a desired height relative to said outer shaft, said locking means positioned on said first end of said outer shaft to removably engage said inner shaft;
   component support means affixed to said first end of said inner shaft,
   said inner shaft including at least one step-like notch, said notch being configured so as to lockingly engage said locking means;
   said locking means including a handle for disengaging said locking means from said notches;
   a safety guard partially covering said handle along its length for preventing accidental movement of said handle.

2. The support stand as recited in claim 1, wherein said locking means includes a latching device.

3. The support stand as recited in claim 1, wherein said base support includes at least three legs, each of said legs having a first end and a second end.

4. The support stand as recited in claim 3, wherein said first end of said legs are connected to said second end of said outer shafts, and said second end of said legs having connected thereto a knob for increased balance and to prevent slipping.

5. The support stand of claim 1, wherein said second end of said inner shaft is inserted into an inner passageway of said outer shaft and is telescopically extendable therefrom, and said first end configured so as to be able to support and hold components located on the underside of a vehicle.

6. A support stand used in conjunction with an automotive shop lift for servicing a vehicle comprising;
   a telescopic inner shaft having a first end, a second end, and a plurality of sides, at least one of said sides having integrated perpendicular thereto a plurality of notches along the longitudinal axis of said at least one of said sides, and said first end of said inner shaft having a support plate affixed thereto;
   an outer shaft having a first end, a second end, and a plurality of sides, said outer shaft having an inner passageway extending through the longitudinal axis of said outer shaft and forming an opening at said first end and configured so as to allow said inner shaft to slidably fit and telescopically extend from said outer shaft;
   a base section connected to said second end of said outer shaft to be positioned perpendicular to a surface and which supports said outer and inner shafts;
   locking means for securing and stabilizing said inner shaft at a desired height relative to said outer shaft mounted onto said first end of said outer shaft, and including an engagement latch for locking engagement with said notches; and
   actuating means operationally connected to said locking means for selectively actuating said latch of said locking means to engage or disengage one of said notches.
   a safety guard disposed around a side and along the length of said actuating means for preventing the accidental movement of said actuating means.

7. The support stand as recited in claim 6, wherein said inner and said outer shafts are rectangularly shaped.

8. The support stand as recited in claim 6, wherein said notches run the entire longitudinal length of said side of said inner shaft.

9. The support stand as recited in claim 6, wherein said inner and outer shafts are of a length so that, when the inner shaft is telescopically extended from said outer shaft and locked into place with said locking means, said inner shaft and said outer shaft can reach and securely hold components located on the underside of a vehicle when the vehicle is elevated.

10. The support stand as recited in claim 6, wherein said support plate is a horizontal planar surface having two ends, each end being an angular portion of greater than 0 degrees from the horizontal planar surface.

11. The support stand as recited in claim 6, wherein said base section has at least three legs having first and a second ends, said legs connected to and depending from the sides of said outer shaft at said first ends.

12. The support stand as recited in claim 11, wherein said legs are cylindrical and have resilient and slip resistant end caps attached to said second ends.

13. The support stand as recited in claim 6, wherein said actuating means is a crank-shaped handle which extends through said locking means and is operationally connected to said engagement latch.

14. The support stand as recited in claim 6, wherein said locking means is fully integral with and forms said second end of said outer shaft.

15. A vehicle component support stand used to assist in servicing a vehicle comprising;
   a rectangularly shaped outer shaft having a first end and a second end, and four sides, said outer shaft having an inner passageway extending through the longitudinal axis of said outer shaft and forming an opening at said first end;
   a rectangularly shaped inner shaft having a first end, a second end, and four sides, said inner shaft being coaxial with said outer shaft, at least one of said sides having integrated along its longitudinal axis a plurality of engagement notches, and said first end of said inner shaft having a component support affixed thereto, which is capable of securely holding components found on the underside of a vehicle when elevated;
   a base section including four legs, each of said legs having a first and a second end, said first end of each of said legs connected to and depending from said sides of said outer shaft, said second end of each of said legs-having resilient and slip resistent end caps attached thereto, said base section to be positioned perpendicular to a surface and which supports said outer and inner shafts in an upright position;

locking means for securing and stabilizing said inner shaft at a desired height relative to said outer shaft, mounted onto said first end of said outer shaft, and including an engagement latch for locking engagement with said engagement notches; and actuating means operationally connected to said locking means for selectively actuating said latch of said locking means to engage or disengage one of said notches, a safety guard connected to the locking means partially covering and extending along the length of said actuating means for preventing the accidental movement of said actuating means.

16. The support stand as recited in claim 15, wherein said locking means is fully integrated and forms said second end of said outer shaft.

17. The support stand as recited in claim 15, wherein said actuating means is an L-shaped crank handle operationally connected to said latch of said locking means.

* * * * *